US012600403B2

(12) United States Patent (10) Patent No.: US 12,600,403 B2
Pathan (45) Date of Patent: Apr. 14, 2026

(54) METHOD FOR CHECKING A STEER-BY-WIRE STEERING SYSTEM, STEERING SYSTEM, AND VEHICLE

(71) Applicant: Schaeffler Technologies AG & Co. KG, Herzogenaurach (DE)

(72) Inventor: Habeeb Khan Pathan, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 108 days.

(21) Appl. No.: 18/578,051

(22) PCT Filed: Jun. 8, 2022

(86) PCT No.: PCT/DE2022/100428

§ 371 (c)(1),
(2) Date: Jan. 10, 2024

(87) PCT Pub. No.: WO2023/284908

PCT Pub. Date: Jan. 19, 2023

(65) Prior Publication Data

US 2024/0317300 A1 Sep. 26, 2024

(30) Foreign Application Priority Data

Jul. 15, 2021 (DE) ..................... 10 2021 118 346.4

(51) Int. Cl.
B62D 5/04 (2006.01)
B62D 5/00 (2006.01)

(52) U.S. Cl.
CPC .......... B62D 5/0481 (2013.01); B62D 5/001 (2013.01); B62D 5/006 (2013.01); B62D 5/0484 (2013.01); B62D 5/0487 (2013.01)

(58) Field of Classification Search
None
See application file for complete search history.

(56) References Cited

U.S. PATENT DOCUMENTS 7,039,557 B2 * 5/2006 Mayer ...................... G07C 3/00
702/184
10,768,075 B2 * 9/2020 Yu ........................... G01L 5/221
(Continued)

FOREIGN PATENT DOCUMENTS

CN 110525511 A * 12/2019 ........... B62D 5/0481
CN 110606120 A * 12/2019 ........... B62D 5/0481
(Continued)

*Primary Examiner* — Kevin R Steckbauer

(57) ABSTRACT

The disclosure relates to a method for checking a steer-by-wire steering system that includes a steering device, a steering wheel, an actuator configured to exert a torque on the steering wheel, and a control unit configured to correlate a steering wheel angle of the steering wheel with a steering angle of the steering device The method comprises the following steps: i) the actuator is controlled in a closed-loop manner such that the steering wheel angle is correlated with a desired angle and a temporal progression of a state variable of the steering wheel and/or of the actuator is determined; ii) a frequency spectrum of the temporal progression of the state variable is determined and an amplitude of a predefined spectral component of the frequency spectrum is determined; and, iii) a state of the mechanical coupling is classified depending on the amplitude of the spectral component.

20 Claims, 1 Drawing Sheet

(56) References Cited

U.S. PATENT DOCUMENTS

| | | | | |
|---|---|---|---|---|
| 11,084,526 | B2 * | 8/2021 | Yu | B62D 15/022 |
| 11,492,038 | B2 * | 11/2022 | Acosta Aponte | B62D 5/0481 |
| 11,892,519 | B2 * | 2/2024 | Gizinski | B62D 5/046 |
| 2005/0049835 | A1 * | 3/2005 | Mayer | G07C 5/00 |
| | | | | 702/184 |
| 2008/0271942 | A1 * | 11/2008 | Yamashita | B62D 5/04 |
| | | | | 180/443 |
| 2019/0359252 | A1 * | 11/2019 | Yu | G06F 17/142 |
| 2019/0383707 | A1 * | 12/2019 | Yu | G01L 5/221 |
| 2021/0323602 | A1 * | 10/2021 | Acosta Aponte | B62D 5/0481 |
| 2021/0342500 | A1 * | 11/2021 | George | G06F 30/15 |
| 2023/0349983 | A1 * | 11/2023 | Gizinski | B62D 5/0481 |
| 2024/0317300 | A1 * | 9/2024 | Pathan | B62D 5/006 |
| 2024/0409154 | A1 * | 12/2024 | Frank | B62D 5/0493 |
| 2025/0058821 | A1 * | 2/2025 | Friedel | B62D 5/046 |

FOREIGN PATENT DOCUMENTS

| | | | | | |
|---|---|---|---|---|---|
| CN | 112384431 | A | * | 2/2021 | B62D 9/00 |
| CN | 110525511 | B | * | 8/2021 | B62D 5/0481 |
| CN | 110606120 | B | * | 10/2021 | G01L 5/221 |
| CN | 112384431 | B | * | 8/2023 | B62D 5/0481 |
| CN | 116979485 | A | * | 10/2023 | G01R 31/40 |
| CN | 117177897 | A | * | 12/2023 | B62D 5/0484 |
| CN | 119117078 | A | * | 12/2024 | B62D 5/0481 |
| DE | 19834868 | A1 | | 2/2000 | |
| DE | 10144076 | A1 | * | 3/2003 | G07C 5/00 |
| DE | 10321825 | A1 | | 12/2003 | |
| DE | 102014211815 | A1 | | 12/2015 | |
| DE | 102015122253 | A1 | | 6/2017 | |
| DE | 102019111415 | A1 | * | 11/2019 | B62D 5/0481 |
| DE | 102018211764 | A1 | * | 1/2020 | B62D 7/20 |
| DE | 102019111415 | B4 | * | 6/2022 | B62D 5/0481 |
| DE | 102021118346 | B3 | * | 8/2022 | B62D 5/0484 |
| DE | 102022200268 | A1 | * | 7/2023 | B62D 5/046 |
| DE | 102023109112 | A1 | * | 11/2023 | G01R 31/40 |
| DE | 102024113568 | A1 | * | 12/2024 | B62D 5/0481 |
| DE | 102018211764 | B4 | * | 2/2025 | B62D 9/00 |
| EP | 1423827 | B1 | * | 6/2008 | G07C 3/00 |
| JP | 2004161073 | A | * | 6/2004 | |
| JP | 2005504272 | A | * | 2/2005 | G07C 5/00 |
| JP | 4052469 | B2 | * | 2/2008 | G07C 5/00 |
| JP | 2008254729 | A | * | 10/2008 | B62D 5/0481 |
| WO | WO-03023721 | A2 | * | 3/2003 | G07C 5/00 |
| WO | WO-2020016052 | A1 | * | 1/2020 | B62D 5/0481 |
| WO | WO-2023284908 | A1 | * | 1/2023 | B62D 5/0484 |
| WO | WO-2023134964 | A1 | * | 7/2023 | B62D 5/046 |

* cited by examiner

METHOD FOR CHECKING A STEER-BY-WIRE STEERING SYSTEM, STEERING SYSTEM, AND VEHICLE

CROSS-REFERENCE TO RELATED APPLICATIONS

This application is the U.S. National Phase of PCT Application No. PCT/DE2022/100428 filed on Jun. 8, 2022, which claims priority to DE 10 2021 118 346.4 filed on Jul. 15, 2021, the entire disclosures of which are incorporated by reference herein.

TECHNICAL FIELD

The disclosure relates to a method for checking a steer-by-wire steering system.

BACKGROUND

In steer-by-wire systems, the steering command generated by the operating element (steering wheel) is transmitted electronically to the steering device, where it is converted into a steering movement of the wheels by means of an actuator. In contrast to purely manual or electromechanically or hydraulically supported steering systems, the complete mechanical decoupling between the steering wheel and the steering device results in a number of technical challenges. In systems in which the torque for the steering movement of the wheels is applied entirely or partially via the steering wheel, the steering haptics provides the driver with important feedback about the vehicle behavior and the contact between the wheels and the road. In addition, the position of the steering wheel shows the driver the alignment of the wheels, which provides an important orientation aid, especially when starting the vehicle. In steer-by-wire systems, due to the lack of direct mechanical access to the wheels, the haptic feedback must be artificially generated by an actuator connected to the steering wheel and the correlation between the steering wheel position and the wheel position must be established by an additional balance mechanism. For these functions, such systems usually have an actuator that simulates the missing mechanical feedback by exerting a torque on the steering wheel or by bringing the steering wheel into the desired position.

Steer-by-wire systems with steering wheel actuators are known, for example, from the publications DE 198 34 868 A1, DE 103 21 825 B4 and DE 10 2014 211 815 A1. The torque generated by the actuator is usually transmitted to the steering wheel shaft via a mechanical coupling, for example in the form of a worm gear set. With such arrangements, however, the technical problem arises that the mechanical coupling between the actuator and the steering wheel is subject to mechanical wear and tear during operation, so that the positioning and transmission accuracy, the mechanical play, and the friction behavior can change over time. This can affect both the haptic feedback and the control of the desired position.

SUMMARY

Against this background, the object is to provide a method and a steering system with which the state of the mechanical coupling between the actuator and the steering wheel can be checked, so that signs of wear and tear can be detected at an early stage and, if necessary, compensated for.

The object is achieved by a method for checking a steer-by-wire steering system for a steering system that includes a steering device connected to vehicle wheels, a steering wheel, an actuator, and a control unit. The actuator is configured to exert a torque on the steering wheel via a mechanical coupling and the control unit is configured to adjust a steering wheel angle of the steering wheel to correlate with a steering angle of the steering device by controlling the actuator. The method includes the following steps:

in a control step, the actuator of the steering wheel is controlled in such a way that the steering wheel angle is correlated with a desired angle, and a temporal progression of a state variable of the steering wheel and/or the actuator is determined;

in an analysis step, a frequency spectrum of the temporal progression of the state variable is determined and an amplitude of a predefined spectral component of the frequency spectrum is determined; and in a classification step, a classification of a state of the mechanical coupling is carried out depending on the amplitude of the spectral component.

The method according to the disclosure is based on the knowledge gained through a detailed analysis of the control behavior of steer-by-wire systems that a change in the mechanical coupling between the actuator and the steering wheel is expressed in characteristic oscillations of the temporal behavior of the control process for the steering wheel position, so that the occurrence of such oscillations can be used as an indicator of the state of the mechanical coupling.

During normal operation of the steering system, the function of the control unit is to ensure that the position of the steering wheel—the steering wheel angle—correctly reflects the orientation of the steering device—the steering angle. For this purpose, both the steering wheel angle and the steering angle are recorded by sensors and any deviation is compensated for by the control of the actuator. In particular, this comparison can take place before the vehicle is set in motion, for example when the vehicle is started. The steering wheel position can be determined in particular by a rotation angle sensor, which can be arranged, for example, on the steering wheel shaft. The steering angle can also be determined by a rotation angle sensor which in particular detects the position of the wheels or the position of a component of the steering gear, for example, a steering pinion. The actuator for actuating the steering wheel can be, for example, a permanent magnet synchronous motor (or another form of AC motor) or a brushless or brushed DC motor, which drives the steering wheel or the steering wheel shaft via the mechanical coupling with a controlled actuating torque applied via the control unit.

This control mechanism, which initially serves to correlate the steering wheel angle with the steering angle, is used in the method according to the disclosure as follows to check the mechanical coupling between the actuator and the steering wheel: First, in the control step, a desired angle for the steering wheel is predefined and the actuator is controlled by the control unit in such a way that the steering wheel is brought into the desired position. In this case, the desired angle can be, in particular, the steering angle of the steering device set at this point in time. However, it is also possible to specify a desired angle that does not correspond to the steering angle and is used exclusively for checking the system. For example, the desired angle can be selected in such a way that it differs from the current steering wheel angle by a predefined difference, which is then controlled to zero by the control unit. It is also conceivable to first use the actuator to turn the steering wheel by a predetermined angle relative to the steering angle and then compensate for the difference using the control. It is also possible to carry out the control process several times and to set several different desired angles one after the other. During the control of the steering wheel angle, the temporal progression of a state variable is determined and stored in particular in a memory element of the control unit. The state variable can be, for example, a position or parameter of the steering wheel or the actuator and depicts the dynamics of the control process, so that the temporal progression of the control process becomes accessible for a subsequent analysis. In particular, the temporal progression can be determined over a predefined time interval or over the entire control period until the steering wheel angle is correlated with the desired angle. In the analysis step, the frequency spectrum of the temporal progression of the state variable is then determined and an amplitude of a predefined spectral component of the frequency spectrum is determined. The spectral component can be, for example, a predefined frequency or a plurality of predefined frequencies, in particular one or more frequency intervals. It is also conceivable that a maximum of the frequency spectrum is identified within a predefined frequency interval and the amplitude of the maximum is determined. The frequency at which the characteristic fluctuations of the control occur and which is accordingly predefined for the analysis step, depends on the mechanical coupling and the control mechanism used, and can be, for example, in a frequency interval of 10 Hz to 300 Hz, 30 Hz to 200 Hz or 50 Hz to 100 Hz (depending on the position of the characteristic frequencies of the components such as the natural frequency of the mechanical component). The amplitude is in particular a complex amplitude of the spectral component, wherein an amount or square of the amount is preferably formed for the further evaluation of the amplitude, or in the case of several frequencies, a sum or an integral of amounts or squares of the amounts. Based on the amplitude determined in this way, an evaluation of the mechanical coupling between the actuator and the steering wheel can then be carried out in the classification step using a predefined criterion or a plurality of criteria. In the simplest case, it can be checked, for example, whether the determined amplitude, or a parameter derived from the amplitude, is within a tolerance interval or below a predefined limit. The criterion for the classification can be based in particular on empirically obtained data, for example on a comparison of spectra that were determined based on mechanical couplings with different degrees of wear and tear. The criterion can also be based on theoretical or computational modeling of the mechanical coupling and its friction behavior. If the check shows that the criterion is not met, for example, that the parameter under consideration is outside the tolerance interval, an increased degree of wear can be concluded based on the strength of the oscillations quantified by the amplitude. In this way, the state of the mechanical coupling can be checked through a relatively simple evaluation of the system behavior, so that mechanical degradation can be detected at an early stage and appropriate measures can be taken. In particular, the steps of the method are carried out automatically when the vehicle is stationary, for example in the initial phase after starting the vehicle or after the vehicle has been parked. It is also conceivable to repeat the checking procedure automatically at regular intervals and in this way to monitor the system for wear over a longer period of operation. The degree of wear and/or tear can be displayed in particular via a user interface (Human Machine Interface, HMI), for example, on the dashboard of the vehicle.

According to an example embodiment of the method according to the disclosure, in an adjustment step following the classification step, a control parameter for controlling the actuator is adjusted depending on the amplitude of the spectral component. Several control parameters can also be adjusted. In particular, the control parameter or parameters can be an amplification factor and/or a time constant of the control. The adjustment is preferably carried out depending on a predefined relationship between the amplitude of the spectral component and the value of the control parameter, in particular in such a way that the adjusted value of the control parameter leads to a reduction or complete suppression of the control oscillations. For example, such a relationship can be based on empirically obtained data or a mathematical or computer-aided model and can specify an associated value of the control parameter for different amplitude values, which maximally reduces or completely eliminates the oscillations. Preferably, the relationship between the amplitude and the value of the control parameter is stored in a memory of the control unit and is read from the memory by the control unit in the adjustment step. The connection can be a functional connection or a data record, for example in the form of a table. It is also conceivable for the adjustment to take place depending on amplitudes of a number of spectral components, for example by differentiating between a number of frequency ranges during the adjustment and by including both the amplitude and the frequency range of the oscillation in the adjustment when oscillations occur. In this way, the detected abnormalities in the frequency spectrum are not only used to classify the state of the mechanical coupling, but at the same time they are used to make a specific adjustment of the control tailored to the strength of the oscillations, thereby stabilizing the control mechanism.

According to an example embodiment of the method according to the disclosure, a result of the classification, in particular a degree of degradation of the mechanical coupling, is displayed in a display step following the classification step. In the simplest case, for example, a warning can be issued that an anomaly has been detected that requires further checking of the system. In particular, the classification can take place depending on a predefined relationship between amplitude and degree of degradation. For example, such a relationship can be based on empirically obtained data or a mathematical or computer-aided model and can specify an associated degree of degradation for different amplitude values. Preferably, the relationship between the amplitude and the degree of degradation is stored in a memory of the control unit and is read from the memory by the control unit in the classification step or in the display step. In particular, the method can be designed in such a way that an adjustment of the control parameter as well as the displaying of the result of the classification are carried out. It is also conceivable that when oscillations occur, one or more adjustments to the control parameter are initially made, but once a certain degree of degradation has been reached, a warning is issued that further checking, repairing, or replacing of the mechanical coupling is required.

According to an example embodiment, the state variable is a torque or an angle of rotation of the steering wheel or a torque or an angle of rotation of the actuator. In particular, the state variable is measured by a torque sensor or an angle sensor. For example, the steering system can have an angle sensor and/or a torque sensor arranged on the steering wheel shaft for this purpose. Likewise, an angle sensor (rotor position sensor) and/or a torque sensor can be arranged on the actuator, which measures the position of the rotor or the torque generated by the actuator. Combinations are also conceivable in which output signals from several sensors are included in the analysis step, i.e., for the analysis the temporal progression of the torque of the steering wheel and/or the angle of rotation of the steering wheel and/or the torque of the actuator and/or the angle of rotation of the actuator is determined and the associated frequency spectra determined.

According to an example embodiment of the method according to the disclosure, the mechanical coupling is a reduction gear, in particular a worm gear set.

The frequency spectrum is preferably determined using a discrete Fourier transformation, in particular a fast Fourier transformation.

According to an example embodiment, it is provided that the actuator is controlled depending on a difference between the steering wheel angle and the desired angle, wherein the control is also effected in particular depending on a rate of change over time of the steering wheel angle. In this embodiment, the control unit is part of a control circuit in which the control difference is first formed from the desired value, in particular the desired angle, and the actual value, in particular the current steering wheel angle, and the control of the actuating torque of the actuator takes place depending on the control difference amplified by an amplification factor. In particular, the control circuit can also have a non-linear control circuit element that limits the amplified control difference to a value between a predefined lower and upper limit. Preferably, the amplified control difference or the limited amplified control difference is used to form a further control difference with the current angular velocity of the steering wheel. The angular velocity can be obtained in particular by differentiation from the temporal progression of the steering wheel angle. The further control difference can then be amplified by a second amplification factor and, in particular, limited to a value between two limits by a further non-linear control circuit element. The control of the actuating torque of the actuator takes place accordingly depending on the amplified further control difference or the limited amplified further control difference.

According to an example embodiment, it is provided that the control parameter is a first amplification factor which amplifies the difference between the steering wheel angle and the desired angle, wherein in the adjustment step, in particular, an additional adjustment of a second amplification factor for the control takes place depending on the rate of change over time of the steering wheel angle. For the adjustment of the second amplification factor, the design options described above for the adjustment step arise in particular in an analogous manner.

Another object of the disclosure is a steer-by-wire steering system, comprising a steering device connected to vehicle wheels, a steering wheel, an actuator, and a control unit. The actuator is configured to exert a torque on the steering wheel via a mechanical coupling, and the control unit is configured to control the actuator in such a way that a steering wheel angle of the steering wheel is controlled to correlate with a steering angle of the steering device. The control unit is configured so that:

in a control step, it controls the actuator of the steering wheel in such a way that the steering wheel angle is correlated with a desired angle, and the control unit is configured to determine a temporal progression of a state variable of the steering wheel and/or of the actuator;

in an analysis step, it determines a frequency spectrum of the temporal progression of the state variable and determines an amplitude of a predefined spectral component of the frequency spectrum; and in a classification step, it performs a classification of a state of the mechanical coupling depending on the amplitude of the spectral component.

In particular, the steering system according to the disclosure is thus configured to carry out the method according to the disclosure. All of the refinements described in relation to the method are transferred analogously to the steering system according to the disclosure. The steps carried out in the example embodiments of the method, such as the adjustment step, the display step, and/or the implementation of the Fourier transformation, are preferably carried out by the control unit.

Another object of the disclosure is a vehicle having an embodiment of the steer-by-wire steering system according to the disclosure.

BRIEF DESCRIPTION OF THE DRAWINGS

Further details of the disclosure will be explained below with reference to the exemplary embodiment shown in the drawings. In these.

DETAILED DESCRIPTION

Figure 1:
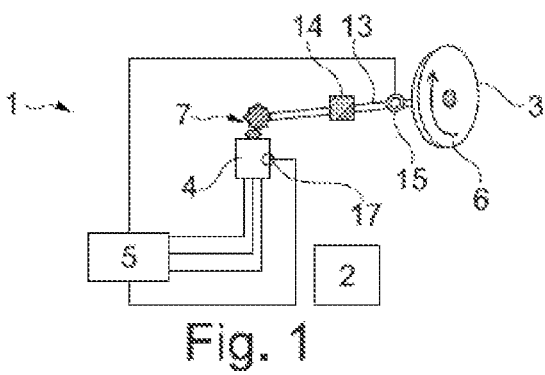
FIG. 1 shows a steer-by-wire system to illustrate the method according to the disclosure.

FIG. 1 shows the schematic structure of a steer-by-wire steering system 1, based on which the concept according to the disclosure is explained below. The two main components of the steering system 1 are the operating unit in the form of the steering wheel 3 and the steering device 2 controlled by the steering wheel, which generates the steering torque by means of an actuator, and transmits this to the wheels of the vehicle. The core idea of the steer-by-wire approach is to transmit the steering command generated by the steering wheel to the steering device 2 purely electronically, so that any mechanical coupling between the steering wheel 3 and the steering device 2 is completely eliminated. For this purpose, a multi-turn angle sensor 14 is arranged on the steering wheel shaft 13, which detects the rotation of the shaft 13 caused by the steering wheel 3 and passes on the measured steering wheel angle 6 to the steering device 2.

To create a realistic feel (e.g., a corresponding steering resistance) and to influence the position of the steering wheel 3 in a desired manner, the steering column has an actuator 4, for example a permanent magnet synchronous motor or a brushless DC motor, which can apply a torque to the steering wheel shaft 13. The motor 4 transmits the torque it generates via a mechanical coupling 7, which is usually implemented by a worm gear set. In addition to generating the haptic feedback, this mechanism is used to adjust the steering wheel angle 6 to correlate with the steering angle of the steering device 2. For this purpose, the actuator 4 is controlled via the control unit 5 in such a way that the torque generated by the actuator 4 brings the steering wheel 3 into the desired position. In the case shown, the system has a further angle sensor 15, which passes on the position of the steering wheel shaft 13 to the control unit 5. In addition, another sensor 17 detects the position of the rotor of the actuator 4 and also passes this on to the control unit. Based on this sensor data, the actuator 4 is then controlled by the control unit 5 so that the steering wheel 3 is brought into the desired position.

With the hardware components shown, the method according to the disclosure can be implemented by appropriately configuring the control unit 5. As described below, the oscillations of the control behavior are analyzed and conclusions drawn about the state of the mechanical coupling 7.

Figure 2:
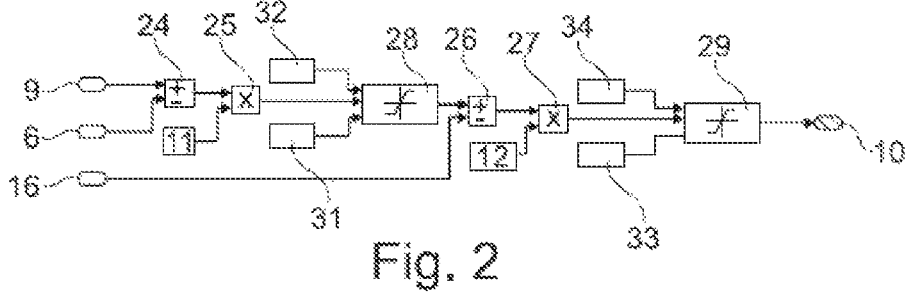
FIG. 2 shows a control circuit for controlling the steering wheel angle.

FIG. 2 shows a possible implementation of the control circuit with which the steering wheel angle 6 is correlated with the steering angle at the desired angle 9. In addition to the desired angle 9, the control is based on the current steering wheel angle 6 detected by the sensor 15 and the angular velocity 16 formed by temporal differentiation of the steering wheel angle 6. From the desired value 9 and the actual value 6, the difference is first formed by the control circuit element 24, which is then multiplied by the amplification factor 11 by the element 25. The amplified signal is then limited to a value between the lower and upper limits 31, 32 by a nonlinear control circuit element 28. The output signal of the element 28 then goes into a further difference formation 26 with the angular velocity 16, which in turn experiences an amplification 27 by a factor of 12 and is then limited by the element 29 (with the limits 33 and 34). The output signal is ultimately used to operate the actuator 5, which generates the actuating torque 10 for the steering wheel 3 and transmits it to the steering wheel shaft 13 through the mechanical coupling 7.

The amplification factors 11 and 12 are selected in this control circuit so that the controlled actuating torque 10 brings the steering wheel quickly and stably into the desired position. However, the efficiency and stability of this mechanism depends on the state of the mechanical coupling 7, which is exposed to unavoidable mechanical loads and the associated mechanical wear during operation. The changes that occur over time in the play and in the friction behavior of the coupling 7 affect the torque transmitted to the steering wheel shaft 13, and thus not only affect the control mechanism shown but also the parts of the system that simulate steering haptics via the actuator 4. In the method according to the disclosure, the influence of the coupling 7 on the control process is used to draw conclusions about the state of the coupling 7 and any signs of wear. In addition, the information obtained in this way can be used to compensate for the negative effects on the control.

Figure 3:
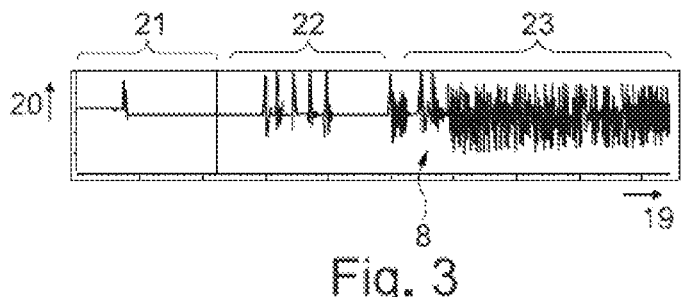
FIG. 3 shows the temporal behavior of the control when the control parameter changes.

FIG. 3 shows the progression 8 of a state variable 20 of the control circuit from FIG. 2 as a function of time 19, which results in different values of the amplification factor 11. In the case shown, state variable 20 is torque 10 generated by actuator 4. In the steering system 1 examined, the mechanical coupling 7 between the actuator 4 and the steering wheel 3 has altered friction behavior due to wear and tear, so that the transmission of the torque 10 to the shaft 13 is also altered compared to the original state. In the time series shown, the amplification factor 11 for the control difference between the steering wheel angle 6 and the desired angle 16 is successively increased to the value at which optimal control behavior would result in the wear-free state of the coupling 7. In the first time interval 21 the amplification factor 11 is approximately 50 percent of the original value, in the second interval 22 it is approximately 80 percent, and in the third time interval it is 100 percent of the original value. As can be clearly seen in FIG. 3, an instability in the control behavior occurs in the third time period 23, which manifests itself in oscillations of the actuating torque 10. As has been shown through analysis of the control behavior, these oscillations arise in a characteristic frequency range, which in the case shown is between 50 and 100 Hz. This characteristic signature can be detected via a spectral analysis and can be used to suppress the oscillations as described below.

Figure 4:
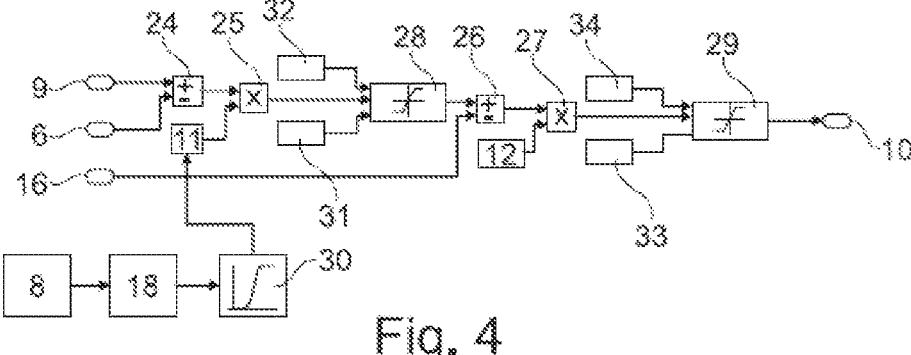
FIG. 4 shows the adjustment of the control parameter.

FIG. 4 shows a modified variant of the control circuit from FIG. 2, which has an additional mechanism to improve the control behavior. In addition to the components of the control circuit shown in FIG. 2, the temporal progression of a state variable 20 of the steering wheel 3 and/or the actuator 4 (cf. FIG. 3) is subjected to a fast Fourier transformation 18 by the control unit 5 and the amplitude of a spectral component is determined which corresponds to the characteristic frequency of the oscillations from FIG. 3. This amplitude is then assigned an optimal value for the amplification factor 11 by the evaluation 30. The amplification factor 11 of the control circuit is adjusted accordingly (for example to 80 or 50 percent of the original value; cf. FIG. 3), so that the oscillations in the control behavior are effectively suppressed.

The method described above is an embodiment of the method according to the disclosure for checking a steer-by-wire steering system 1, wherein the steering system 1 comprises a steering device 2 connected to vehicle wheels, a steering wheel 3, an actuator 4, and a control unit 5. The actuator 4 is configured to exert a torque 10 on the steering wheel 3 via a mechanical coupling 7 and the control unit 5 is configured to adjust a steering wheel angle 6 of the steering wheel 3 to correlate with a steering angle of the steering device 2 by controlling the actuator 4. The method has the following steps:

in a control step, the actuator 4 of the steering wheel 3 is controlled in such a way that the steering wheel angle 6 is correlated with a desired angle 9, and a temporal progression 8 of a state variable 20 of the steering wheel 3 and/or the actuator 4 is determined;

in an analysis step, a frequency spectrum 18 of the temporal progression 8 of the state variable 20 is determined and an amplitude of a predefined spectral component of the frequency spectrum 18 is determined; and in a classification step, a classification of a state of the mechanical coupling 7 is carried out depending on the amplitude of the spectral component.

LIST OF REFERENCE SYMBOLS

1 Steering system
2 Steering device
3 Steering wheel
4 Actuator
5 Control unit
6 Steering wheel angles
7 Coupling between steering wheel and actuator
8 Temporal progression of the state variable
9 Desired angle
10 Actuating torque
11 First amplification factor
12 Second amplification factor
13 Steering wheel shaft
14 Multi-turn angle sensor
15 Angle sensor 16 Steering wheel angular velocity
17 Rotor position sensor
18 Frequency spectrum
19 Time
20 State variable
21 Course at the first value of the control parameter
22 Course at the second value of the control parameter
23 Course at third value of the control parameter
24 First control difference
25 Amplification of the first control difference
26 Second control difference
27 Amplification of the second control difference
28 First limiting element
29 Second limiting element
30 Relationship between amplitude and amplification adjustment
31 Lower limit of the first limiting element
32 Upper limit of the first limiting element
33 Lower limit of the second limiting element
34 Upper limit of the second limiting element

The invention claimed is:

1. A method for checking a steer-by-wire steering system, the steering system comprising a steering device configured to be connected to vehicle wheels, a steering wheel, an actuator configured to exert a torque on the steering wheel via a mechanical coupling, and a control unit configured to adjust a steering wheel angle of the steering wheel to correlate with a steering angle of the steering device via controlling of the actuator, the method comprising:

controlling, in a control step, the actuator of the steering wheel so that the steering wheel angle is correlated with a desired angle and a temporal progression of a state variable of the steering wheel is determined;

determining, in an analysis step, a frequency spectrum of the temporal progression of the state variable and an amplitude of a predefined spectral component of the frequency spectrum, the predefined spectral component corresponding to a state of the mechanical coupling; and classifying, in a classification step, a state of the mechanical coupling based on the amplitude of the predefined spectral component.

2. The method according to claim 1, wherein in an adjustment step following the classification step, a control parameter for the controlling of the actuator is adjusted based on the amplitude of the predefined spectral component.

3. The method according to claim 1, wherein in a display step following the classification step, a degree of degradation of the mechanical coupling is displayed.

4. The method according to claim 1, wherein the state variable is a torque of the steering wheel.

5. The method according to claim 1, wherein the mechanical coupling is a gear set.

6. The method according to claim 1, wherein the frequency spectrum is determined via a fast Fourier transformation.

7. The method according to claim 2, wherein the controlling of the actuator depends on: i) a difference between the steering wheel angle and the desired angle, and ii) a rate of change over time of the steering wheel angle.

8. The method according to claim 7, wherein the control parameter is a first amplification factor configured to amplify the difference between the steering wheel angle and the desired angle, and, in the adjustment step, a second amplification factor for the controlling of the actuator is adjusted based on the rate of change over time of the steering wheel angle.

9. A steer-by-wire steering system comprising:
a steering device connected to vehicle wheels,
a steering wheel,
an actuator configured to exert a torque on the steering wheel via a mechanical coupling, and
a control unit configured such that:
in a control step, the actuator is controlled by the control unit such that a steering wheel angle correlates with a desired angle, and the control unit is configured to determine a temporal progression of a state variable of at least one of the steering wheel and the actuator, and controlling of the actuator depends on: i) a difference between the steering wheel and the desired angle, and ii) a rate of change over time of the steering wheel angle;

in an analysis step, the control unit determines a frequency spectrum of the temporal progression of the state variable and determines an amplitude of a predefined spectral component of the frequency spectrum; and in a classification step, of the control unit classifies a state of the mechanical coupling is carried out based on the amplitude of the predefined spectral component; and in an adjustment step: i) a control parameter for the controlling of the actuator is adjusted based on the amplitude of the predefined spectral component, and the control parameter is a first amplification factor configured to amplify the difference between the steering wheel angle and the desired angle, and ii) a second amplification factor for the controlling of the actuator is adjusted based on the rate of change over time of the steering wheel angle.

10. A vehicle comprising a steer-by-wire steering system according to claim 9.

11. The method according to claim 1, wherein the state variable is an angle of rotation of the steering wheel.

12. The method according to claim 1, wherein the mechanical coupling is a worm gear set.

13. A method for checking a steer-by-wire steering system, the steering system comprising a steering device configured to be connected to vehicle wheels, a steering wheel, an actuator configured to exert a torque on the steering wheel via a mechanical coupling, and a control unit configured to adjust a steering wheel angle of the steering wheel to correlate with a steering angle of the steering device via controlling of the actuator, the method comprising:

controlling, in a control step, the actuator of the steering wheel so that the steering wheel angle is correlated with a desired angle and a temporal progression of a state variable of the actuator is determined;

determining, in an analysis step, a frequency spectrum of the temporal progression of the state variable and an amplitude of a predefined spectral component of the frequency spectrum, the predefined spectral component corresponding to a state of the mechanical coupling; and classifying, in a classification step, a state of the mechanical coupling based on the amplitude of the predefined spectral component.

14. The method according to claim 13, wherein the state variable is a torque of the actuator.

15. The method according to claim 13, wherein the state variable is an angle of rotation of the actuator.

16. The method according to claim 13, wherein the frequency spectrum is determined via a fast Fourier transformation.

17. The method according to claim 13, wherein in an adjustment step following the classification step, a control parameter for the controlling of the actuator is adjusted based on the amplitude of the predefined spectral component.

18. The method according to claim 17, wherein in a display step following the classification step, a degree of degradation of the mechanical coupling is displayed.

19. The method according to claim 17, wherein the controlling of the actuator depends on: i) a difference between the steering wheel angle and the desired angle, and ii) a rate of change over time of the steering wheel angle.

20. The method according to claim 19, wherein the control parameter is a first amplification factor configured to amplify the difference between the steering wheel angle and the desired angle, and, in the adjustment step, a second amplification factor for the controlling of the actuator is adjusted based on the rate of change over time of the steering wheel angle.

\* \* \* \* \*